United States Patent [19]
King et al.

[11] Patent Number: 5,306,130
[45] Date of Patent: Apr. 26, 1994

[54] APPARATUS FOR RECAPPING A TIRE AND AN IMPROVED CURING ENVELOPE FOR USE THEREIN

[75] Inventors: Michael J. King, Concord, Calif.;
Paul E. Rier, Jr., Argyle, Tex.;
Robert A. Flynn, San Francisco, Calif.

[73] Assignee: Oliver Rubber Company, Oakland, Calif.

[21] Appl. No.: 899,766

[22] Filed: Jun. 17, 1992

[51] Int. Cl.[5] .............................. B29C 35/02
[52] U.S. Cl. .......................... 425/17; 156/96;
156/382; 156/909; 264/36; 425/20; 425/24
[58] Field of Search ............ 156/96, 286, 382, 394.1, 156/441.5, 909; 264/36; 425/17, 19, 20, 23, 24

[56] References Cited

U.S. PATENT DOCUMENTS

| | | | |
|---|---|---|---|
| 2,644,984 | 7/1953 | Crooker | 425/20 |
| 3,325,326 | 6/1967 | Schelkmann | 156/96 |
| 3,793,116 | 2/1974 | Schelkmann | 156/909 |
| 3,966,535 | 6/1976 | Abularach | 156/394 |
| 4,053,265 | 10/1977 | Wulker et al. | 264/36 |
| 4,075,047 | 2/1978 | Brodie et al. | 156/96 |
| 4,151,027 | 4/1979 | Schelkmann et al. | 156/96 |
| 4,309,234 | 1/1982 | Witherspoon | 156/96 |
| 4,328,053 | 5/1982 | Medlin, Jr. | 156/96 |
| 4,434,018 | 2/1984 | Brewer | 264/36 |
| 4,500,375 | 2/1985 | Goldstein | 425/20 |
| 4,571,277 | 2/1986 | Goldstein | 264/36 |
| 4,767,480 | 8/1988 | Goldstein | 156/909 |
| 4,816,095 | 3/1989 | Taylor | 156/96 |
| 5,055,148 | 10/1991 | Lindsay et al. | 156/909 |

Primary Examiner—Charles S. Bushey
Attorney, Agent, or Firm—Baker & Botts

[57] ABSTRACT

An improved curing envelope is provided for use in a retreading or recapping process. The improved curing envelope includes integrally formed gas passageways in the inner circumferential wall thereof which permits the ingress and egress of gas into the interior of the curing envelope and retains pre-cured tread material in position for properly forming or securing the new tread to the carcass during the bonding process.

13 Claims, 3 Drawing Sheets

APPARATUS FOR RECAPPING A TIRE AND AN IMPROVED CURING ENVELOPE FOR USE THEREIN

TECHNICAL FIELD OF THE INVENTION

This invention relates generally to tire recapping. More particularly, but not by way of limitation, this invention relates to an improved tire recapping apparatus using pre-cured tread material and to an improved curing envelope for use therein.

BACKGROUND OF THE INVENTION

The recapping of tires has heretofore been accomplished by first building up a layer of uncured rubber on a buffed tire carcass. Sometimes a flexible ring mold having a negative tread pattern imprint is then placed around the built-up tire and the whole assembly placed in a sealing envelope. This whole assembly is then placed into a vulcanizing chamber and the rubber is cured with the imprint of the mold contained therein.

During placement of the mold over the built-up tire, the mold must be stretched and expanded to allow the tread pattern to fit around the built up tire. Alternatively, the tire must be "buckled" to receive the mold and then inflated against the mold. During curing of the rubber with the mold so disposed, the rubber assumes a plastic state, thereby allowing the mold tread pattern to sink into the rubber to form the positive contour of the tread. This process is normally assisted by some form of external force such as high chamber pressure applied to the mold, the aspiration and resiliency of the sealing envelope or pressure applied to the build up tire to force outward against the mold.

More recently, pre-cured tread material has been utilized for recapping. Such pre-cured tread material has the tread formed therein, eliminating the need for a tire tread mold. In using the "pre-cure", a bonding gum is inserted between the retread material and a tire carcass and heat is applied to cause the "pre-cure" to adhere to the carcass.

The aforementioned process required the use of vent string, vent straps and perforated members to permit air flow into and out of the curing envelope.

The use of materials such as the vent strings, vent straps and the use of polypropylene films that are perforated to permit air to flow between the curing envelope and the mold frequently require such items to be stapled to the tire. Sometimes the stapling results in small pinhole leaks. In any event, the use of such materials requires additional time to apply those materials during the retreading process. The additional time and materials increase the cost of the retreading or recapping.

SUMMARY OF THE INVENTION

To overcome the aforementioned problems, this invention utilizes an improved sealing envelope that is provided with a plurality of air or gas passages on the interior surface thereof. The use of such a curing envelope eliminates the necessity for placing vent strings, vent straps or the perforated polypropylene film between the curing envelope and the "pre-cure" to allow circulation of air and gas therethrough.

BRIEF DESCRIPTION OF THE DRAWING

The foregoing and additional objects and advantages of the invention will become more apparent as the following detailed description is read in conjunction with the accompanying drawing wherein like referenced characters denote like parts in all views and wherein.

DETAILED DESCRIPTION OF THE INVENTION

Figure 2:
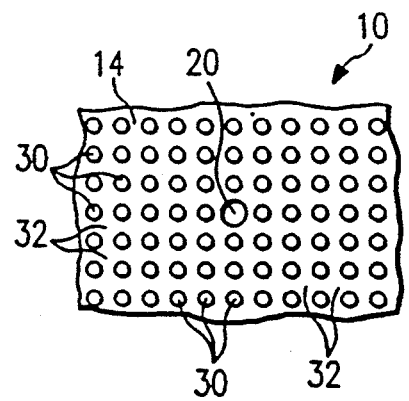
FIG. 2 is a schematic illustrating a pattern that can be formed on the interior circumferential surface of the curing envelope of FIG. 1.
Figure 1:
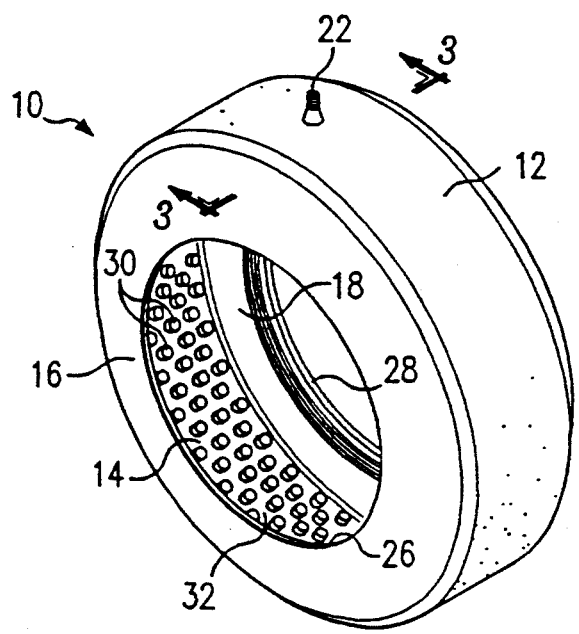
FIG. 1 is a perspective view of a curing envelope that is constructed in accordance with the invention.
Figure 3:
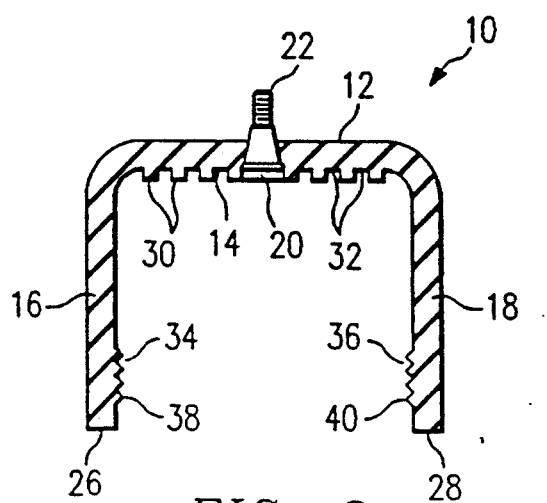
FIG. 3 is an enlarged cross-sectional view taken generally along the line 3—3 of FIG. 1.

Referring to the drawing and FIGS. 1, 2 and 3 in particular, shown therein generally designated by the referenced character 10 is a curing envelope that is constructed in accordance with the invention. As shown most clearly in FIG. 1, the curing envelope 10 is an annular member of generally U-shaped cross-sectional configuration (see FIG. 3). The envelope 10 includes an outer circumferential surface 12, an inner circumferential surface 14 and a pair of sidewalls 16 and 18.

Preferably, the envelope 10 is constructed from a flexible, elastomeric material that is sufficiently flexible to be applied over a tire carcass and that can withstand the heat required for curing the rubber retread material. One such material is Bromobutyl rubber manufactured by Exxon Chemical.

An air or gas flow passageway 20 extends through the curing envelope 10. In alignment with the flow passageway 20 is a hollow valve stem 22. The valve stem 22 may be provided with appropriate valving (not shown). The inner circumferential surface 14 of the envelope 10 is provided with a plurality of lands 30 that are spaced apart to provide a plurality of flow passages 32 therebetween which are in communication with the flow passageway 20. Preferably, there are about 100 lands 30 per square inch. The lands 30 are enlarged for clarity in the drawing.

Each of the sidewalls 16 and 18 terminates in a sealing edge portion 26 and 28. Located adjacent to the annular sealing edges 26 and 28 are a plurality of annular striations 34 and 36 which provide sealing lands 38 and 40 which sealingly engage the side wall of a tire carcass 42 (see FIG. 5).

Figure 4:
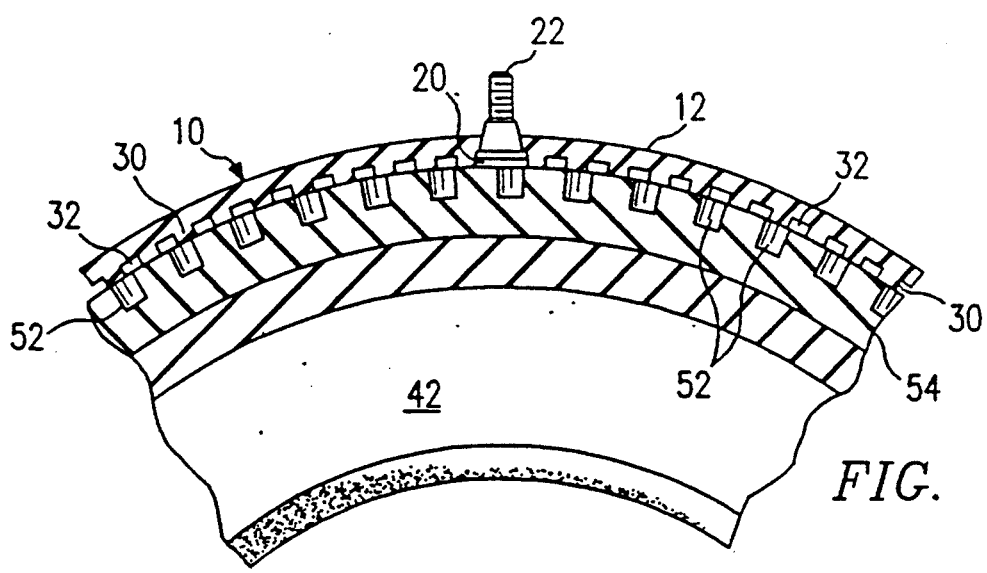
FIG. 4 is an enlarged, fragmentary cross-sectional view of a portion of the pre-cure and envelope assembled on a tire carcass.
Figure 5:
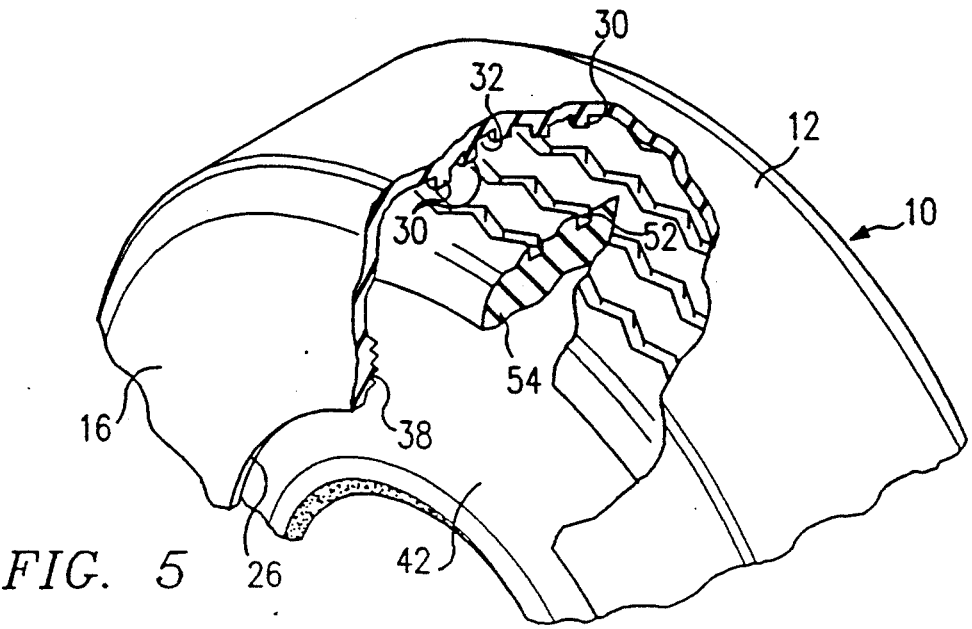
FIG. 5 is a fragmentary, perspective view, partially in cross-section, illustrating the pre-cure and envelope assembled on a tire carcass.

FIGS. 4 and 5 are views of a tire carcass 42 having a pre-cure material 54 thereon. The tread pattern is indicated at 52. The sealing envelope 10 encircles the pre-cure 54 and is in position to be pressurized.

After the various materials are in place on the tire carcass 42, a wheel (not shown) is placed in the center opening of the tire carcass and pressure is applied into the tire carcass 42. Pressure is also applied through the valve stem 22 into the sealing envelope 10. Generally, such pressures are about 140 psig within the tire carcass 42 and about 70 psig within the sealing envelope 10. The tire carcass 42, pre-cure 54, and sealing envelope 10, etc. are then placed in an oven (not shown) and heated for the appropriate time to cause the bonding gum to secure the pre-cure 54 to the carcass 42.

It should be pointed out that it is possible, when using the envelope 10, to apply the gas pressure within the sealing envelope 10 without the use of ties or perforated plastic liner materials due to the configuration of the inner circumferential surface 14 of the envelope 10. Also, once curing has been completed, it is possible to easily release the pressure from inside the sealing envelope 10 since the pressurized gas can flow through the channels 32 between the lands 30 to the flow passageway 20.

Figure 6:
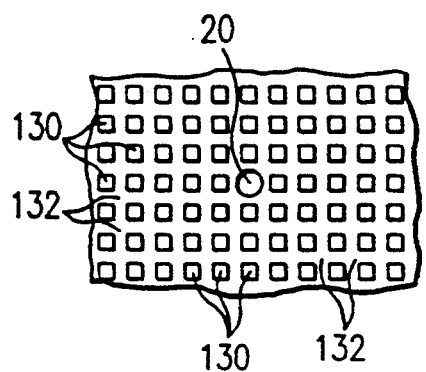
FIG. 6 is a view similar to FIG. 2, but illustrating another pattern that can be utilized in the interior of the sealing envelope of FIG. 1.

FIG. 6 illustrates another pattern of flow passages 132 channels on the inner circumferential surface 14 of the sealing envelope 10. As shown in FIG. 6, the passages 132 are formed by a plurality of a rectangular lands 130 and are in fluid communication with the flow passageway 20.

Figure 7:
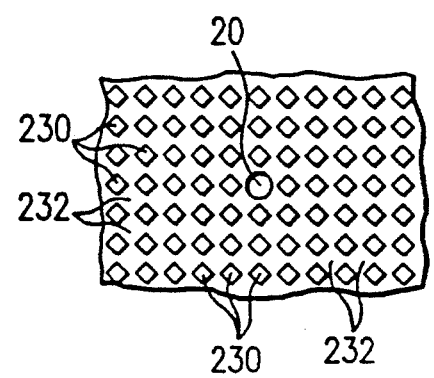
FIG. 7 is a view similar to FIG. 6, but illustrating still another pattern that can be utilized in the sealing envelope of FIG. 1.

Similarly, FIG. 7 illustrates another flow passage pattern that can be utilized in the inner circumferential surface 14 of the sealing envelope 10. As shown therein, the passageway 20 extends generally through the center of the illustration in communication with flow passages 232 formed on diagonals on the inner circumferential surface by lands 230 which project therefrom.

Figure 8:
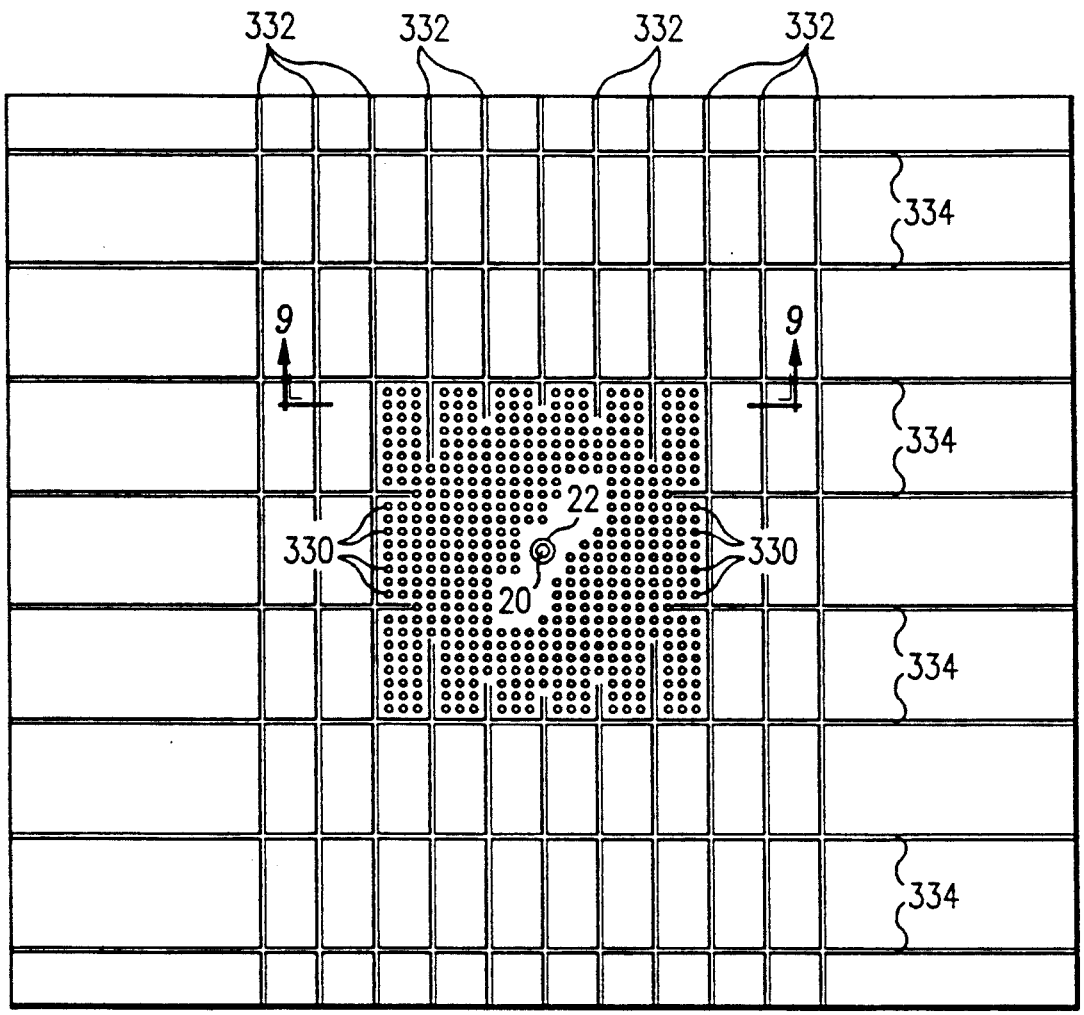
FIG. 8 is a view similar to FIG. 6, but illustrating still another pattern that can be utilized in the sealing envelope of FIG. 1.
Figure 9:
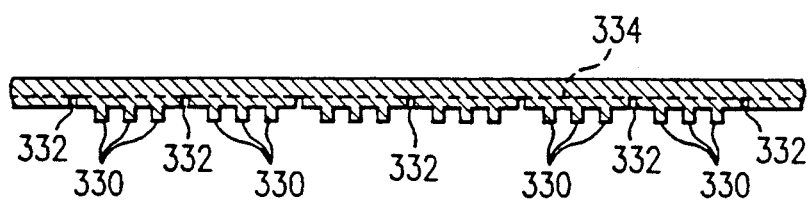
FIG. 9 is a fragmentary cross-sectional view taken generally along line 9—9 of FIG. 8.

FIGS. 8 and 9 illustrate still another flow passage pattern that can be utilized in the inner circumferential surface 14 of the sealing envelope 10. As shown in FIG. 8, the area around the valve stem 22 includes protuberances 330 arranged in a generally rectangular pattern. The inner surface is scored with a plurality of radial grooves 332 and circumferential grooves 334 to provide the original flow passages.

As will be understood, the particular configuration of the lands and grooves or passages is not critical so long as they are located mainly on the inner circumferential surface 14 and do not extend too far down the sidewalls 16 and 18 of the envelope 10. It is of course important that they provide for continuous communication with the flow passageway 20 so that gas can be introduced into the sealing envelope and allowed to escape therefrom through the valve stem 22.

From the foregoing detailed description, it can be seen that the curing envelope 10 described in detail herein provides the means for avoiding the difficulties of holding the pre-cured tread material in place to form the retread. As mentioned hereinbefore, it was necessary in the past to utilize tying straps, vent straps and to provide a layer of perforated material or something similar to permit gas flow inside the envelope. The improved curing envelope disclosed herein which has the gas flow passageways formed integrally with the inner circumferential wall thereof, provides all of the foregoing requirements without necessitating the use of the additional materials. Also, by not having to use the materials, a substantial amount of time and some material cost is saved in the retreading or recapping process thereby providing a process that costs less to perform than prior art processes.

What is claimed is:

1. An improved curing envelope for use in retreading a tire body using an annular layer of retread material, said improvement comprising a flexible, elastomeric annular member arranged to be positioned to encompass said retread material to hold said material in place, said annular member including:
   a generally U-shape cross-section;
   spaced, annular sealing edge portions for sealingly engaging the sidewalls of the tire;
   a gas passageway extending through said annular member between said sealing edge portions; and
   an annular interior surface on said member between said edge portions including a plurality of protuberances and a plurality of interconnected passages connecting with said passageway to permit ingress and egress of gas through said passageway to apply pressure to said retread material during the curing step of retreading of said tire and to permit full escape of gas therefrom.

2. The curing envelope of claim 1 wherein said interconnected passages comprise:
   a plurality of radial passages; and
   a plurality of circumferential passages intersecting said radial passages.

3. The curing envelope of claim 1 wherein said annular interior surface includes a plurality of spaced lands forming said interconnected passages.

4. The curing envelope of claim 1 wherein each said sealing edge portion includes a plurality of spaced, annular striations forming a plurality of annular sealingly surfaces for sealing engaging one sidewall of said tire.

5. The curing envelope of claim 2 wherein each said sealing edge portion includes a plurality of spaced, annular striations forming a plurality of annular sealing surfaces for sealingly engaging one sidewall of said tire.

6. The curing envelope of claim 1 wherein each said sealing edge portion includes a plurality of spaced, annular striations forming a plurality of annular sealingly surfaces for sealing engaging one sidewall of said tire.

7. Apparatus for recapping tires utilizing a layer of pre-cured tread material encircling a prepared tire carcass with bonding gum located therebetween, said apparatus comprising a flexible, elastomeric annular curing envelope for securing said tread material around a circumferential surface of said tire carcass and for applying an external force radially inwardly to securely hold said tread material during curing of said bonding gum, said envelope including a plurality of gas passages and protuberances on an interior thereof.

8. The apparatus of claim 7 wherein said flexible, elastomeric annular curing envelope is generally U-shaped in cross-section, and said envelope includes:
   spaced annular sealing edge portions for sealingly engaging sidewalls of the tire carcass;
   a gas passageway extending through said envelope between said edge portions; and
   an annular, interior wall between said edge portions wherein said plurality of gas passages are interconnected and connect with said passageway to permit ingress and egress of gas through said passages to apply pressure to said tread material during the curing of said bonding gum and to permit full escape of gas therefrom.

9. The apparatus of claim 8 wherein said interconnected passages comprise:
   a plurality of radial passages; and, a plurality of circumferential passages intersecting said radial passages.

10. The curing envelope of claim 8 wherein said annular interior wall includes a plurality of spaced lands forming said interconnected passages.

11. The curing envelope of claim 8 wherein each said sealing edge portion includes a plurality of spaced, annular striations forming a plurality of annular sealing surfaces for sealingly engaging one sidewall of said tire.

12. The curing envelope of claim 9 wherein each said sealing edge portion includes a plurality of spaced, annular striations forming a plurality of annular sealing surfaces for sealingly engaging one sidewall of said tire.

13. The curing envelope of claim 10 wherein each said sealing edge portion includes a plurality of spaced, annular striations forming a plurality of annular sealing surfaces for sealingly engaging one sidewall of said tire.

* * * * *